(12) United States Patent
Machado Amorim et al.

(10) Patent No.: US 11,919,102 B2
(45) Date of Patent: Mar. 5, 2024

(54) ASSEMBLY OF AT LEAST 2 METALLIC SUBSTRATES

(71) Applicant: ArcelorMittal, Luxembourg (LU)

(72) Inventors: Tiago Machado Amorim, Longeville les Metz (FR); Stéphanie Michaut, Remilly (FR); Maxime Brossard, Metz (FR); Pascal Bertho, Yutz (FR); Jean-Marie Helmer, Maizieres-les-Metz (FR)

(73) Assignee: ArcelorMittal, Luxembourg (LU)

( * ) Notice: Subject to any disclaimer, the term of this patent is extended or adjusted under 35 U.S.C. 154(b) by 376 days.

(21) Appl. No.: 17/269,791

(22) PCT Filed: Sep. 9, 2019

(86) PCT No.: PCT/IB2019/057577
§ 371 (c)(1),
(2) Date: Feb. 19, 2021

(87) PCT Pub. No.: WO2020/053735
PCT Pub. Date: Mar. 19, 2020

(65) Prior Publication Data
US 2021/0252627 A1      Aug. 19, 2021

(30) Foreign Application Priority Data

Sep. 13, 2018 (WO) .................. PCT/IB2018/056997

(51) Int. Cl.
*B23K 11/11*      (2006.01)
*B23K 101/00*     (2006.01)
(Continued)

(52) U.S. Cl.
CPC ....... *B23K 11/115* (2013.01); *B23K 2101/006* (2018.08); *B23K 2101/34* (2018.08);
(Continued)

(58) Field of Classification Search
CPC . B23K 11/11; B23K 11/115; B23K 2101/006; B23K 2101/34; B23K 2103/04; B23K 2103/172; B23K 2103/20
(Continued)

(56) References Cited

U.S. PATENT DOCUMENTS 5,793,011 A      8/1998   Watanabe et al.
10,406,627 B2    9/2019   Fujimoto et al.
(Continued)

FOREIGN PATENT DOCUMENTS

BY      6959 C1      3/2005
CN      1128192 A    8/1996
(Continued)

OTHER PUBLICATIONS

Translation of cited DE102014112028 (Year: 2015).*
(Continued)

*Primary Examiner* — Dana Ross
*Assistant Examiner* — Joseph W Iskra
(74) *Attorney, Agent, or Firm* — Davidson, Davidson & Kappel, LLC

(57) ABSTRACT

A method for the manufacture of an assembly of at least two metallic substrates spot welded together through at least one spot welded joint, such method including two steps, the assembly obtainable according to this method and the use of this assembly for the manufacture of automotive vehicle.

23 Claims, 4 Drawing Sheets

(51) Int. Cl.
  *B23K 101/34* (2006.01)
  *B23K 103/04* (2006.01)
  *B23K 103/16* (2006.01)
  *B23K 103/20* (2006.01)

(52) U.S. Cl.
  CPC .... *B23K 2103/04* (2018.08); *B23K 2103/172* (2018.08); *B23K 2103/20* (2018.08)

(58) Field of Classification Search
  USPC ........................................................ 219/91.2
  See application file for complete search history.

(56) References Cited

U.S. PATENT DOCUMENTS

| | | |
|---|---|---|
| 2010/0258537 A1 | 10/2010 | Sigler et al. |
| 2013/0048613 A1 | 3/2013 | Sigler et al. |
| 2014/0305912 A1 | 10/2014 | Taniguchi et al. |
| 2017/0066086 A1 | 3/2017 | Amata et al. |
| 2017/0072502 A1 | 3/2017 | Karagoulis et al. |
| 2017/0291246 A1 | 10/2017 | Sigler et al. |
| 2018/0250766 A1* | 9/2018 | Hwang ................. B23K 11/14 |
| 2018/0257166 A1 | 9/2018 | Sigler |
| 2021/0308784 A1 | 10/2021 | Machado Amorim et al. |

FOREIGN PATENT DOCUMENTS

| | | |
|---|---|---|
| CN | 102950373 A | 3/2013 |
| CN | 103889634 A | 6/2014 |
| CN | 106493480 A | 3/2017 |
| CN | 106994548 A | 8/2017 |
| CN | 108326516 A | 7/2018 |
| DE | 10 2014 112028 A1 | 2/2015 |
| EP | 3020499 A1 | 5/2016 |
| EP | 3085485 A1 | 10/2016 |
| EP | 3175947 A1 | 6/2017 |
| GB | 2468011 A1 | 8/2010 |
| JP | S6343775 A | 2/1988 |
| JP | 2018069289 A | 5/2018 |
| RU | 2243071 C2 | 12/2004 |
| RU | 2553314 C1 | 6/2015 |
| SU | 224301 A1 | 12/1968 |
| WO | WO2011/019430 A1 | 2/2011 |
| WO | WO2017/017513 A1 | 2/2017 |
| WO | WO2017/017514 A1 | 2/2017 |
| WO | WO2017017521 A1 | 2/2017 |
| WO | WO2020053734 A1 | 3/2020 |
| WO | WO2020053736 A1 | 3/2020 |

OTHER PUBLICATIONS

International Search Report of PCT/IB2019/0057577, dated Nov. 11, 2019.

Jeff Shao-Chun Hou, -Chun Hou: Resistance Spot Welding and In-Process Heat Treatment of Hot Stamped Boron Steel, A thesis presented to the University of Waterloo in fulfillment of the thesis requirement for the degree of Masters of Applied Science in Mechanical Engineering, Waterloo, Ontario, Canada, 2016, Mar. 15, 2016.

* cited by examiner

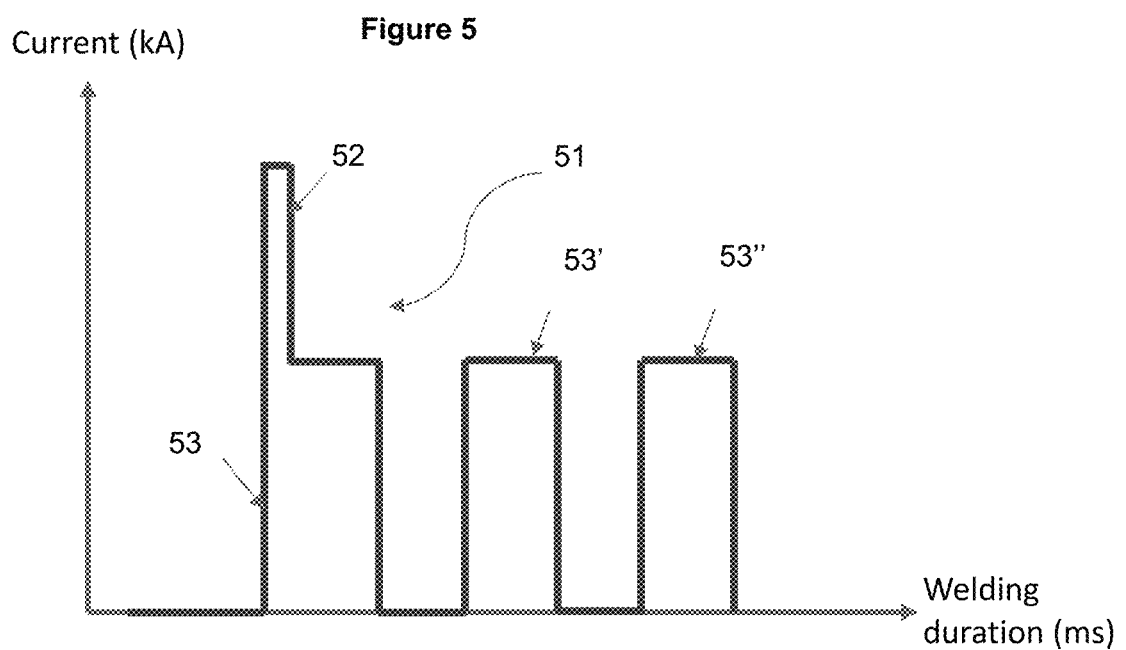

ASSEMBLY OF AT LEAST 2 METALLIC SUBSTRATES

The present invention relates to a method for the manufacture of an assembly of at least two metallic substrates and the assembly. The invention is particularly well suited for the manufacture of automotive vehicles.

BACKGROUND

With a view of saving the weight of vehicles, it is known to use high strength steel sheets to achieve lighter weight vehicle bodies and improve crash safety.

Hardened parts are also used notably to reduce the weight of vehicles. Indeed, the tensile strength of these steels is of a minimum of 1200 MPa and can be up to 2500 MPa. Hardened parts can be coated with an aluminum-based or zinc-based coating having a good corrosion resistance and thermal properties.

Usually, the method for the manufacture of a coated hardened part comprises the following steps:
A) the provision of a steel sheet pre-coated with a metallic coating being conventional coating based on aluminum or zinc,
B) the cutting of the coated steel sheet to obtain a blank,
C) the thermal treatment of the blank at a high temperature to obtain a fully austenitic microstructure in the steel,
D) the transfer of the blank into a press tool,
E) the hot-forming of the blank to obtain a part,
F) the cooling of the part obtained at step E) in order to obtain a microstructure in steel being martensitic or martensito-bainitic or made of at least 75% of equiaxed ferrite, from 5 to 20% of martensite and bainite in amount less than or equal to 10%.

It is generally followed by the welding of two coated hardened parts or one coated hardened part with another metallic substrate. The welding of aluminum or zinc based coated hardened parts is very difficult to realize due to the coating being hard and thick.

The patent application EP3020499 discloses a resistance spot welding method comprising:
a pulsation process of clamping a sheet assembly of two or more overlapping steel sheets including at least one high-tensile steel sheet using a pair of welding electrodes that are connected to a spot welding power source employing an inverter direct current method, and performing a plurality of repetitions of current passing and current pass stopping, while pressing the steel sheets with the welding electrodes; and
a continuous current passing process in which, after the pulsation process, current is passed continuously for a longer period of time than a maximum current passing time of the pulsation process, while pressing the steel sheets with the welding electrodes.

However, this method is only dedicated to hot stamped steel sheets coated with conventional zinc-based-coatings and aluminum-based coatings. Indeed, in Examples, this method was tested on aluminum coated 1500 MPa hot stamped steel sheets, galvannealed coated 1500 MPa grade hot stamped steel sheet and ZnO skin-treated Al coated 1500 MPa grade hot stamped steel sheet. Specific coatings based on aluminum or zinc including other elements are not included in this patent application.

The patent application EP3085485 discloses a resistance spot welding method welding a plurality of steel sheets including a high tensile steel sheet superposed, in which said resistance spot welding method, the conduction system is pulsation conduction using an inverter DC welding power supply, and, in the plurality of current pulses forming the pulsation conduction, at the respective current pulses, the conduction time, the intervals of the current pulses defined as the conduction idle time, and the weld currents applied by the current pulses are variably controlled.

However, this method is dedicated to hot stamped steel sheets comprising on its surface a solid solution of intermetallic compounds and iron by an alloying reaction between a conventional zinc-based (pure Zn, Zn—Fe, Zn—Ni, Zn—Al, Zn—Mg, Zn—Mg—Al, etc.) or a conventional aluminum-based (Al—Si etc.) coating and the steel of the base material. These surfaces are formed with an oxide layer mainly comprised of zinc or aluminum. Further, sometimes the surface of the coating mainly comprised of intermetallic compounds of iron and aluminum is formed with a film mainly comprised of zinc oxide. In Examples, the method was tested on hot stamped steel sheets coated with an alloyed of aluminum coating comprising 9% by weight of Si and Fe and a very small amount of ZnO, and on galvannealed coated hot stamped steel sheets. Usually, the native oxide layer of these coatings has a thickness between 10 and 100 nm. When a thin layer of ZnO is deposited on the aluminum based coated hardened part before the austenitization, ZnO and the aluminum-based coating are alloyed. Since a very thin layer of ZnO is deposited on the aluminum-based coating, the oxide native mainly composed of Aluminum is still very thin after austenitization, i.e. 10-100 nm, leading to an easy welding. Specific coatings based on aluminum or zinc containing other elements are not included in this patent application.

The patent application GB2468011 discloses a method for applying a current for resistive welding of a plate assembly in which a material of at least one plate is a high-tensile material, the method comprising:
a first step of applying a first amperage of a magnitude that softens a surface of a joining location of the high-tensile material, continuously for a first predetermined duration;
a second step of, when the first predetermined duration has passed, switching an energization amount from the first amperage to a second amperage that causes a nugget to grow at the joining location; and
a third step of applying the second amperage continuously for a second predetermined duration.

This method is dedicated to a high-tensile material or a hot-stamped material. The hot-stamped material can be coated with a plating layer. However, the nature of the plating layer is not specified. Additionally, in the first step, low amperage is applied to soften the surface of a joining location and the second step, high amperage is applied to cause the growth of the nugget at the joining location of the high tensile materials. Nevertheless, the low amperage in the first step does not allow the welding of specific coated hot stamped parts wherein the coatings comprising other elements than zinc or aluminum.

Recently, new coatings have been developed for hot formed steel sheets. The patent application WO2017/017521 discloses a phosphatable hardened part coated with an alloyed coating comprising from 0.4 to 20.0% by weight of zinc, from 1.0 to 3.5% by weight of silicon, optionally from 1.0 to 4.0 by weight of magnesium wherein the ratio Zn/Si is between 3.2 and 8.0. The patent application WO2017/017514 discloses a hardened part coated with an alloyed coating comprising from 2.0 to 24.0% by weight of zinc, from 1.1 to 7.0% by weight of silicon and optionally from 1.1 to 8.0% of magnesium, the balance being aluminum wherein the ratio Al/Zn is above 2.9 for improving the liquid metal embrittlement (LME) resistance. The patent application WO2017/017513 discloses a sacrificial steel sheet coated with a coating comprising from 2.0 and 24% by weight of zinc, from 7.1 to 12.0% of silicon, optionally from 1.1 to 8.0% by weight of magnesium, the balance being aluminum wherein the ratio Al/Zn is above 2.9 and the coated sacrificial hardened part obtained after the method of press hardening. These specific coatings have a native oxide layer of a micrometric thickness. Because of the thickness and the hardness of the native oxide layer, these coatings are very difficult to weld.

SUMMARY OF THE INVENTION

No sufficient method has been developed to weld these specific coated hardened parts.

It is an object of the present invention to provide an easy to implement welding method for the manufacture of hardened parts coated with specific coatings based on aluminum or zinc recently developed. In particular for the production lines, an objective is to obtain a welding range for such specific coated hardened parts being equal or above 1 kA.

The present invention provides a welding method for the manufacture of an assembly comprising the following steps:
A. The provision of at least two metallic substrates (3, 3') wherein a first metallic substrate (3) is a hardened steel part coated with:
   an alloyed coating (4) comprising zinc, silicon, optionally magnesium, the balance being aluminum, directly topped by
   A native oxide layer comprising ZnO and optionally MgO,
B. The application of a spot welding cycle with a spot welding machine, comprising welding electrodes (1, 1') and a spot welding power source (2) applying an inverter direct current, through the at least two metallic substrates of step A), said spot welding cycle (21, 31, 41, 51) comprising the following sub-steps:
   i. one pulsation (22, 32, 42, 52) having a pulsation current (Cp) applied through said at least two metallic substrates joined together using welding electrodes connected to the spot welding power source and directly after,
   ii. a welding step (23, 33, 43, 53) having a welding current (Cw) applied through the at least two metallic substrates and wherein the current Cp is above the current Cw and wherein the pulsation duration is shorter than the welding duration.

The present invention also provides an assembly of at least two metallic substrates (3, 3') spot welded together through at least one spot welded joint obtainable according to the method of the present invention, said assembly comprising:
   a first metallic substrate (3) being a hardened steel part coated with:
     an alloyed coating (4) comprising zinc, silicon, optionally magnesium, the balance being aluminum, directly topped by
     A native oxide layer comprising ZnO and optionally MgO,
   said spot welded joint comprising a nugget (5); and said spot welded joint being such that on its top (6), at least a part of the native oxide layer and/or alloyed coating is not present.

The present invention also provides the use of the assembly for the manufacture of an automobile vehicle.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figure:

FIGS. 2, 3, 4 and 5 illustrate Examples of spot welding cycle according to the present invention.

DETAILED DESCRIPTION

Other characteristics and advantages of the invention will become apparent from the following detailed description of the invention.

The designation hardened steel part means a hot-formed or hot-stamped steel sheet having a tensile strength up to 2500 MPa and more preferably up to 2000 MPa. For example, the tensile strength is above or equal to 500 MPa, advantageously above or equal to 1200 MPa, preferably above or equal 1500 MPa.

The invention relates to a welding method for the manufacture of an assembly comprising the following steps:
A. The provision of at least two metallic substrates wherein a first metallic substrate is a hardened steel part coated with:
   an alloyed coating comprising zinc, silicon, optionally magnesium, the balance being aluminum, directly topped by
   A native oxide layer comprising ZnO and optionally MgO,
B. The application of a spot welding cycle with a spot welding machine, comprising welding electrodes and a spot welding power source applying an inverter direct current, through the at least two metallic substrates of step A), said spot welding cycle comprising the following sub-steps:
   i. one pulsation having a pulsation current (Cp) applied through said at least two metallic substrates joined together using welding electrodes connected to the spot welding power source and directly after,
   ii. a welding step having a welding current (Cw) applied through the at least two metallic substrates and wherein the current Cp is above the current Cw and wherein the pulsation duration is shorter than the welding duration.

Without willing to be bound by any theory, it seems that the welding method according to the present invention performed on two metallic substrates comprising at least a hardened steel part coated with the specific coating comprising zinc, silicon, optionally magnesium, the balance being aluminum, allows for a welding range equal or above 1 kA and a decrease of coating splashing on the assembly surface. Indeed, it seems that ZnO and optionally MgO are naturally present on the surface of the hardened steel part due to the oxidation of the hardened steel with air. It is believed that the pulsation having a pulsation current (Cp) higher in intensity than the welding current (Cw) breaks at least a part of the ZnO and optionally MgO oxide layer and/or alloyed coating present on the coated hardened steel part opening a path to the welding current. However, if Cp is below Cw, i.e. outside the scope of the present invention, it is believed that the ZnO and optionally MgO barrier layer will not be broken by the pulsation due to the important amount of ZnO and optionally MgO. Additionally, it seems that the method according to the present invention comprising one pulsation is easy to implement on an R industrial scale.

Figure 1:
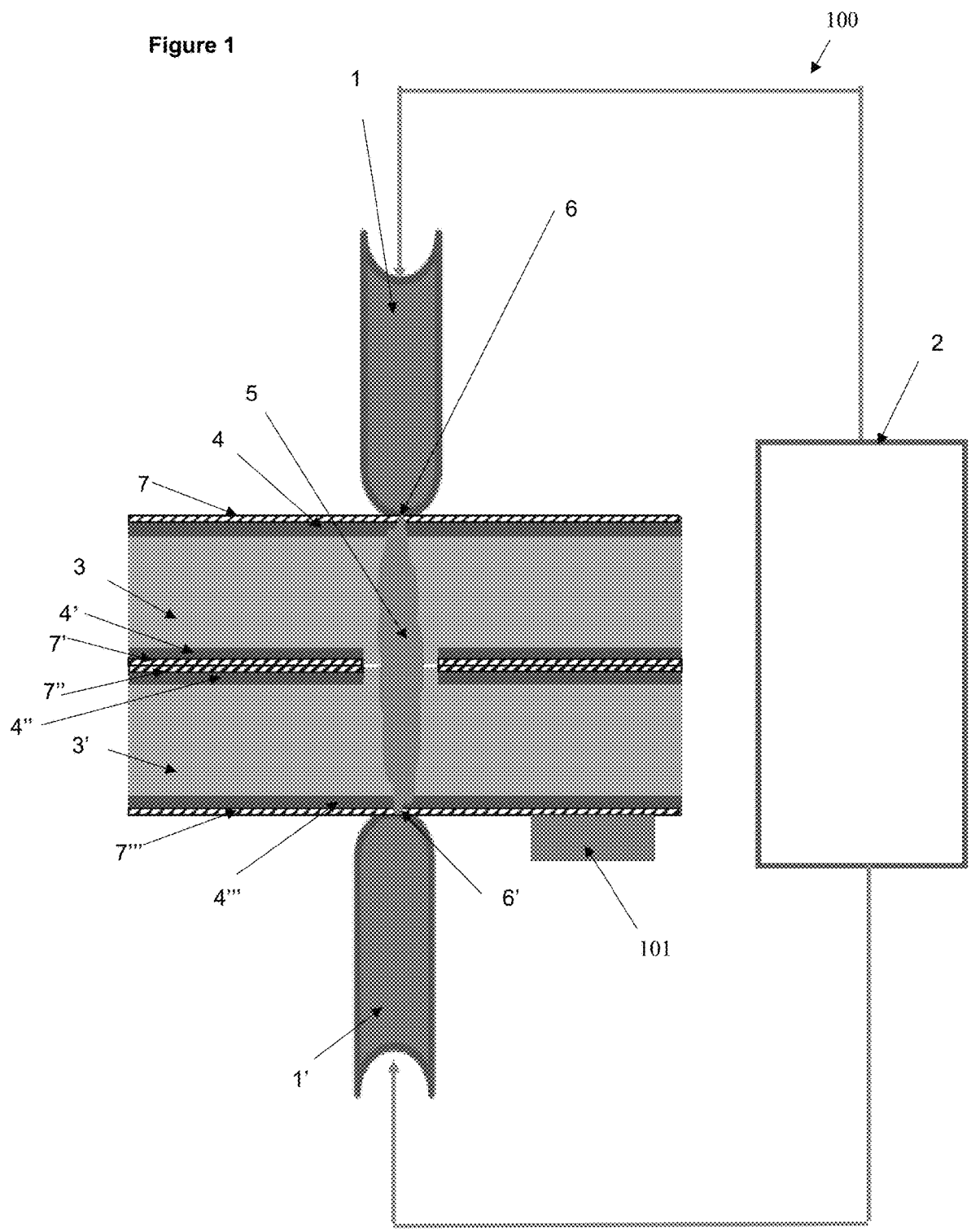
FIG. 1 illustrates an embodiment according to the present invention.

As illustrated in FIG. 1, a spot welding machine 100, comprising welding electrodes 1, 1' and a spot welding source 2, is used. In this Example, the electrodes permit to join two hardened steel parts 3, 3' coated with the coating according to the invention 4, 4', and 4", 4'" respectively on top of which coatings forms native oxide layers 7, 7', 7" and 7'" respectively. During the welding, a nugget 5 is formed between the two hardened steel parts through diffusion. The nugget is an alloy of the residual coatings and the steel parts. Thanks to the spot welding cycle according to the present invention, it is believed that at least a part of the coatings 4, 4', 4", 4'" are removed in the nugget. Moreover, on the top of the spot welded joint 6, 6', it is believed that at least a part of the native oxide layers 7, 7', 7", 7'" and/or alloyed coating is not present. Indeed, it seems that the at least one pulsation breaks the native oxide layer and starts the welding between the coated two hardened steel parts by melting and removing the coatings on top of the spot welded joint and in the nugget. Thus, the current can flow through the two hardened steel parts allowing an improvement of the welding. Finally, it is believed that no cooling is needed between the at least one pulsation and the welding step. Indeed, if a cooling is performed between these steps, there is a risk to stop the formation of the nugget between the two hardened steel parts because the steel parts start to solidify. On the contrary when no cooling is performed, it seems that the steel parts stay in liquid form and can easily be joined together.

Preferably, in step B.i), the pulsation current (Cp) is between 0.1 and 30 kA, preferably between 0.1 and 20 kA, more preferably between 8.0 and 20 kA and advantageously between 8.0 and 15 kA.

Advantageously, in step B.i), the pulsation duration is from 5 to 60 ms, preferably from 4 to 30 ms.

Preferably, in step B.ii), the welding current (Cw) is between 0.1 and 15 kA, advantageously between 0.1 and 7.5 and more preferably between 2.0 and 7.5 kA.

Advantageously, in step B.ii), the welding duration is from 150 to 500 ms and more preferably from 250 to 400 ms.

Preferably, the welding force is between 50 and 550 daN.

In a preferred embodiment, the welding force during the spot welding cycle is between 350 daN and 550 daN.

In another preferred embodiment, the welding force during the spot welding cycle is between 50 daN and 350 daN. In this case, it seems that there is a better localization of current at the electrodes centers allowing a better weldability.

Preferably, the welding frequency is between 500 and 5000 Hz, more preferably 500 and 3000 Hz and for example between 800 and 1200 Hz.

Preferably, the welding step B.ii) comprises a plurality of pulses, the at least one pulsation B.i being directly followed by the first pulse of the welding step. In this case, there is no cooling between the pulsation and the first pulse. The first pulse is followed by one or more pulse(s), a break duration being present between each subsequent pulse. Preferably, the break duration is from 20 to 80 ms and preferably from 30 to 60 ms.

Figure 2:
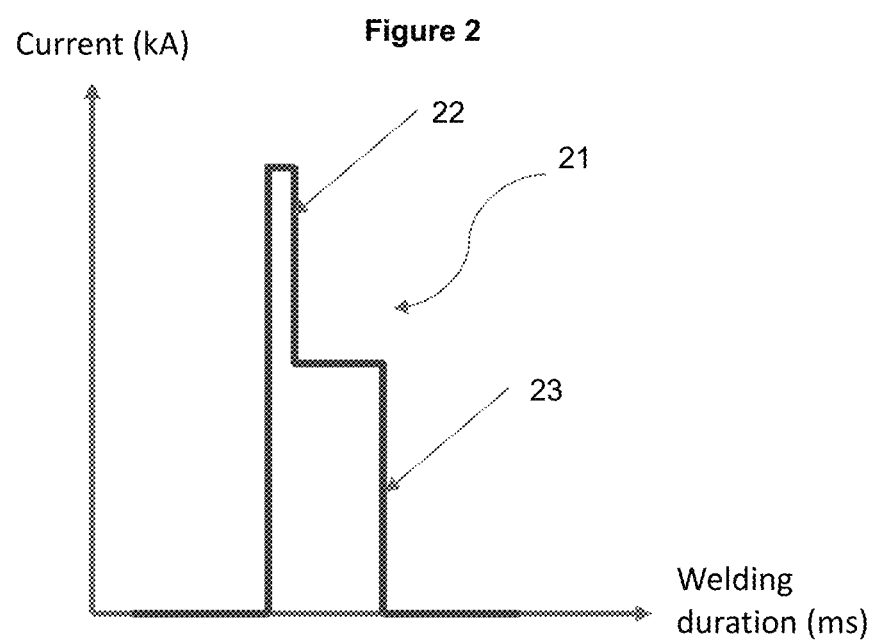
Figure 3:
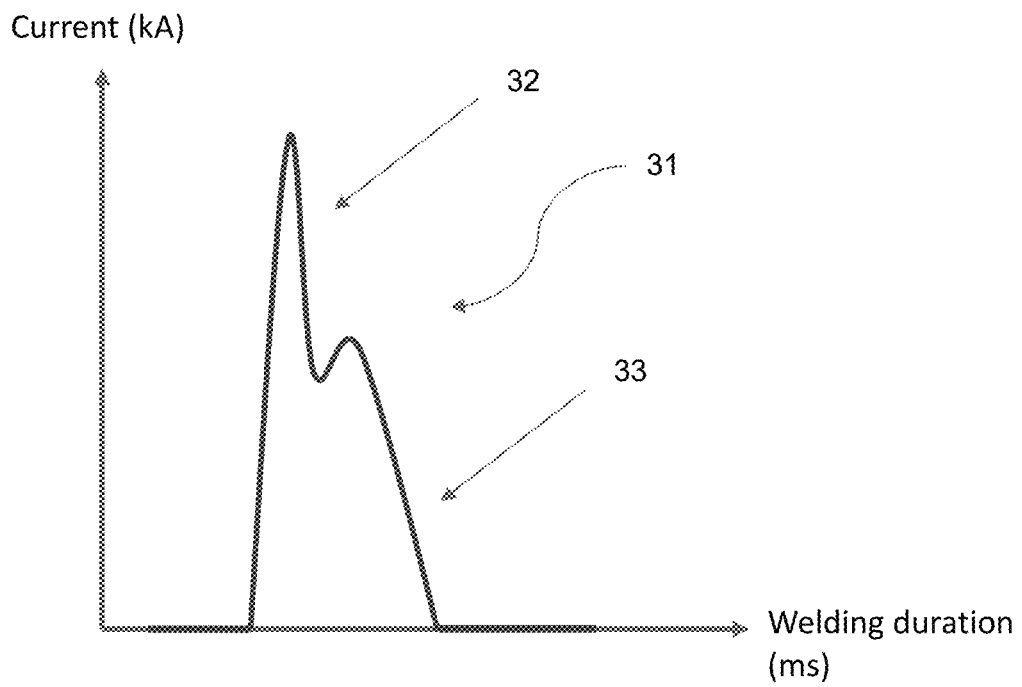
Figure 4:
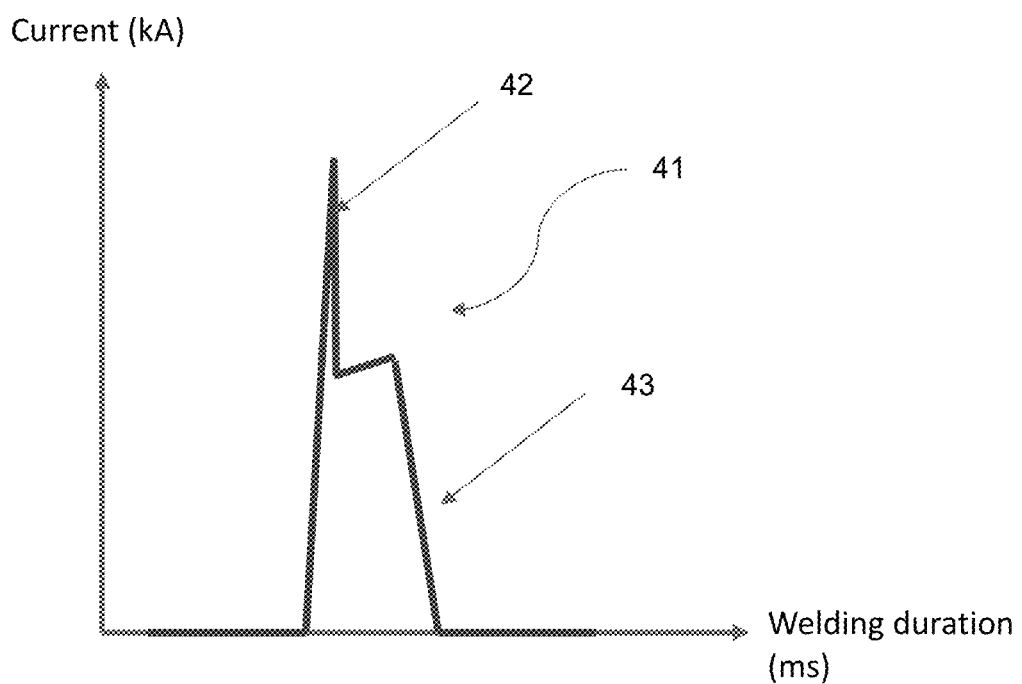

The spot welding cycle according to the present invention can have different shapes. FIG. 2 illustrates one preferred embodiment wherein the spot welding cycle 21 has a rectangular shape comprising a rectangular pulsation peak 22 and a rectangular welding peak 23. FIG. 3 illustrates another preferred embodiment wherein the spot welding cycle 31 has a parabolic shape comprising a parabolic pulsation peak 32 and a parabolic welding peak 33. FIG. 4 illustrates another preferred embodiment wherein the spot welding cycle 41 has a triangular shape comprising a triangular pulsation peak 42 and a triangular welding peak 43. According to other embodiments, the spot welding cycle has a parabolic and a rectangular shape comprising a parabolic pulsation peak and a rectangular welding peak or, a triangular and a rectangular shape comprising a triangular pulsation peak and a rectangular welding peak.

FIG. 5 illustrates one preferred embodiment wherein the spot welding cycle comprises one pulsation B.i being directly followed by a first pulse of the welding step. In this Example, the spot welding cycle 51 has a rectangular shape comprising a rectangular pulsation peak 52 and three rectangular welding peaks 53, 53', 53".

The invention relates also to an assembly of at least two metallic substrates spot welded together through at least one spot welded joint obtainable with the method according to the present invention, said assembly comprising:
  a first metallic substrate being a hardened steel part coated with:
    an alloyed coating comprising zinc, silicon, optionally magnesium, the balance being aluminum, directly topped by
    A native oxide layer comprising ZnO and optionally MgO,
  said spot welded joint comprising a nugget, and said spot welded joint being such that on its top, at least a part of the native oxide layer and/or alloyed coating is not present.

Without willing to be bound by any theory, it seems that when the assembly comprises the above specific coating on the hardened part welded using the welding method according to the present invention, the welding range is equal or above to 1 kA. Indeed, it seems that although the thickness of the native oxide layer is higher than the coatings of the prior art, the welding method according to the present invention breaks the native oxide layer and remove at least a part of the native oxide layer and/or alloyed coating allowing a good weldability of the assembly.

Preferably, the alloyed coating of the hardened steel part comprises from 0.1 to 40.0% by weight of zinc, more preferably between 0.1 and 20.0% by weight of zinc and advantageously between 5.0 and 14% by weight of zinc and for example between 7.0 and 12.0% by weight.

Preferably, the alloyed coating of the hardened steel part comprises from 0.1 to 20.0% by weight of silicon, more preferably from 0.1 to 15.0% by weight of silicon and advantageously from 0.1 to 6.0% by weight of silicon and for example between 2.0 and 6.0% by weight of silicon.

Preferably, the alloyed coating of the hardened steel part comprises from 0.1 to 20.0% by weight of magnesium, from 0.1 to 10.0%, preferably from 0.1 to 4.0% by weight of magnesium.

Optionally, the coating comprises additional elements chosen from Sr, Sb, Pb, Ti, Ca, Mn, Sn, La, Ce, Cr, Zr or Bi, the content by weight of each additional element being inferior to 0.3% by weight and optionally residuals elements from feeding ingots or from the passage of the steel substrate in the molten bath including iron. For example, the amount of iron is up to 5% by weight.

In a preferred embodiment, the second metallic substrate is a steel substrate or an aluminum substrate. Preferably, the second steel substrate is a hardened steel part according to the present invention.

In another preferred embodiment, the assembly comprises a third metallic substrate sheet 101 (shown schematically in FIG. 1) being a steel substrate or an aluminum substrate. In this case, two or several spot welded joints are present.

Finally, the invention relates to the use of the assembly according to the present invention for the manufacture of automotive vehicle.

The invention will now be explained in trials carried out for information only. They are not limiting.

EXAMPLES

All Trials being Usibor® 1500 steel sheets were hot-dip coated with a coating comprising 3% by weight of silicon, 2% by weight magnesium, 10-12% by weight of zinc, the balance being aluminum. The steel sheets were then press hardened at an austenitization temperature of 900° C. for 5 minutes.

Then, for each Trial, two identical press hardened parts were welded together.

The welding range was determined according to the norm SEP1220-2.

Welding test started from 3 kA and increased by 0.2 kA every two spot welds. When two consecutive splashings occurred at the same current level, the splash limit was found. When the splash limit was reached, the welding current was decreased with the step of 0.1 kA to have three consecutive welded samples at the same current level without expulsion. This current level is defined as the upper welding limit of the current range: Imax.

After that, the lower limit Imin was found. Imin search was done by using the criteria of $4\sqrt{t}$, where t is the sheet thickness. This criterion defines the minimum acceptable diameter value that guaranteed the weld quality and strength. For confirmation five consecutive welded samples were obtained with superior welding diameter than minimal welding diameter.

For Trials 1 to 12, 17 and 18, the welding cycle comprises, optionally one pulsation having a pulsation current Cp, and one welding step having a welding current Cw defined by Imin and Imax according the norm SEP1220-2. For Trials 13 to 16, the welding cycle comprises one pulsation having a pulsation current Cp and three or four welding steps having a welding current Cw defined by Imin and Imax according the norm SEP1220-2, a temporary stop being performed between each welding step.

The frequency was of 1000 Hz. The obtained Imin, Imax and the welding current range are in the following Table 1.

| Trials | Zinc percentage in the coating (wt. %) | Welding force (daN) | Pulsation Number | Pulsation duration (ms) | Pulsation Current (Cp) (kA) | Number of welding step(s) | Welding step duration (ms) | Welding step Stop (ms) | Welding current (Cw) Imin (kA) | Welding current (Cw) Imax (kA) | Cp > Cw | Welding current range (kA) |
|---|---|---|---|---|---|---|---|---|---|---|---|---|
| 1 | 12 | 200 | 0 | — | — | 1 | — | — | — | — | — | 0 |
| 2 | 12 | 450 | 0 | — | — | 1 | — | — | — | — | — | 0 |
| 3 | 12 | 200 | 1 | 20 | 4.5 | 1 | — | — | — | — | — | 0 |
| 4* | 12 | 200 | 1 | 20 | 10 | 1 | 340 | — | 4.2 | 5.2 | yes | 1 |
| 5* | 12 | 200 | 1 | 20 | 11 | 1 | 340 | — | 4.46 | 5.65 | yes | 1.19 |
| 6* | 12 | 200 | 1 | 20 | 12 | 1 | 340 | — | 4.46 | 5.88 | yes | 1.42 |
| 7* | 12 | 200 | 1 | 20 | 13 | 1 | 340 | — | 4.6 | 6.2 | yes | 1.6 |
| 8* | 12 | 200 | 1 | 20 | 14 | 1 | 340 | — | 4.87 | 6.66 | yes | 1.79 |
| 9 | 12 | 450 | 1 | 20 | 6 | 1 | — | — | — | — | — | 0 |
| 10 | 12 | 450 | 1 | 20 | 7 | 1 | — | — | — | — | — | 0 |
| 11* | 12 | 450 | 1 | 20 | 16 | 1 | 340 | — | 5.67 | 7.07 | yes | 1.4 |
| 12* | 12 | 450 | 1 | 40 | 10 | 1 | 340 | — | 5.43 | 6.64 | yes | 1.21 |
| 13 | 12 | 450 | 1 | 20 | 10 | 3 | 160 | 40 | 5.6 | 6.1 | yes | 0.5 |
| 14 | 12 | 450 | 1 | 20 | 10 | 3 | 160 | 40 | 4.9 | 5.4 | yes | 0.5 |
| 15 | 12 | 450 | 1 | 20 | 10 | 3 | 160 | 40 | 4.5 | 4.6 | yes | 0.1 |
| 16 | 12 | 450 | 1 | 20 | 10 | 4 | 160 | 40 | — | — | — | 0 |
| 17* | 10 | 200 | 1 | 20 | 10 | 1 | 340 | — | 4 | 5.2 | yes | 1.2 |
| 18* | 10 | 400 | 1 | 20 | 10 | 1 | 340 | — | 4.2 | 5.2 | yes | 1 |

*according to the present invention

Trials 1, 2, 3, 9, 10 and 16 were not weldable, i.e. the criterions of Imin and Imax defined in norm SEP1220-2 were not achieved. Trials according to the present invention have a welding range equal or above 1 kA.

Example 2: Heterogeneous Welding Test

Usibor® 1500 steel sheets were hot-dip coated with a coating comprising 3% by weight of silicon, 2% by weight magnesium, 12% by weight of zinc, the balance being aluminum. The steel sheets were then press hardened at an austenitization temperature between 900° C. for 5 minutes. They were welded with DP600 steel grade (C: 0.14 wt. %, Mn: 2.1 wt % and Si: 0.4 wt. %) coated with a zinc coating. The welding range was determined as in Example 1. The frequency was of 1000 Hz. The obtained Imin, Imax and the welding current range are in the following Table 2.

| | Welding force (daN) | Pulsation | | | Welding | Welding current | | Cp | Welding current |
| Trials | | Number | Duration (ms) | Stop (ms) | Current (kA) | duration (ms) | Imin (kA) | Imax (kA) | > Cw | range (kA) |
|---|---|---|---|---|---|---|---|---|---|---|
| 19* | 200 | 1 | 20 | — | 10 | 340 | 4.8 | 6.6 | Yes | 1.8 |
| 20* | 300 | 1 | 20 | — | 10 | 340 | 5.2 | 6.4 | Yes | 1.2 |

*according to the present invention

Trials according to the present invention have a welding range equal or above 1 kA.

Example 3: Electrode Life Test

Electrode life is defined as the last weld number of a test strip before reaching more than two welds out of eight below a minimum weld diameter defined. The minimum weld diameter was of 4.7 mm.

Two coated hardened steel parts prepared as Trial 4 were welded together with the welding method according to the present invention comprising one pulsation and the welding step. The pulsation current was of 10 kA during 10 ms. The welding current was Imax determined for Trial 4 in Example 1. A plurality of spot welds was performed with the electrodes on the two coated hardened parts and the weld diameter was measured for each spot weld. Results are in the following Table 3.

| Trial | Number of spot welds | Weld diameter (mm) |
|---|---|---|
| 4* | 10 | 5.2 |
| | 100 | 5.2 |
| | 200 | 5.2 |
| | 300 | 5.2 |
| | 400 | 5.2 |
| | 500 | 5.3 |
| | 600 | 5.4 |

*according to the present invention

The weld diameter was always above the minimum weld diameter with Trial 4 according to the present invention.

What is claimed is:

1. A welding method for manufacture of an assembly, the method comprising the following steps:
   A. providing at least two metallic substrates including a first metallic substrate being a hardened steel part coated with:
      an alloyed coating including zinc and silicon, and optionally magnesium, a balance being aluminum, the alloyed coating being directly topped by
      a native oxide layer including ZnO and optionally MgO;
   B. applying a spot welding cycle, with a spot welding machine having welding electrodes and a spot welding power source applying an inverter direct current, through the at least two metallic substrates of step A), the spot welding cycle including the following sub-steps:
      i. applying one pulsation with a pulsation current through the at least two metallic substrates joined together using welding electrodes connected to the spot welding power source, the one pulsation having a pulsation duration, and directly after,
      ii. welding with a welding current applied through the at least two metallic substrates for a welding duration;
      wherein the pulsation current is higher than the welding current and wherein the pulsation duration is shorter than the welding duration.

2. The welding method as recited in claim 1 wherein in step B.i), the pulsation current is between 8.0 and 30.0 kA.

3. The welding method as recited in claim 1 wherein in step B.i), the pulsation duration is from 5 to 60 ms.

4. The welding method as recited in claim 1 wherein in step B.ii), the welding current is between 0.1 and 15 kA.

5. The welding method as recited in claim 1 wherein in step B.ii), the welding duration is from 150 to 500 ms.

6. The welding method as recited in claim 1 wherein a welding force during the spot welding cycle is between 50 and 550 daN.

7. The welding method as recited in claim 6 wherein the welding force during the spot welding cycle is between 350 daN and 550 daN.

8. The welding method as recited in claim 6 wherein the welding force during the spot welding cycle is between 50 daN and 350 daN.

9. The welding method as recited in claim 1 wherein a welding frequency is between 500 and 5000 Hz.

10. The welding method as recited in claim 1 wherein the welding step B.ii) includes a plurality of pulses, the one pulsation in step B.i) being directly followed by a first pulse of the plurality of pulses of the welding step B.ii).

11. The welding method as recited in claim 1 wherein the spot welding cycle shape is selected from the group consisting of:
   a rectangular form including a rectangular pulsation peak and a rectangular welding peak,
   a parabolic form including a parabolic pulsation peak and a parabolic welding peak,
   a triangular form including a triangular pulsation peak and a triangular welding peak,
   a parabolic and a rectangular shape including a further parabolic pulsation peak and a further rectangular welding peak, and
   a triangular and a rectangular shape including a further triangular pulsation peak and a yet further rectangular welding peak.

12. An assembly comprising:
   at least two metallic substrates spot welded together through at least one spot welded joint obtainable according to the method as recited in claim 1, the at least two metallic substrates including a first metallic substrate being a hardened steel part coated with an alloyed coating including zinc and silicon, and optionally magnesium, a balance being aluminum, the alloyed coating being directly topped by a native oxide layer including ZnO and optionally MgO;

the spot welded joint including a nugget; and the spot welded joint being such that on a top at least a part of the native oxide layer or alloyed coating is not present.

13. The assembly as recited in claim 12 wherein the alloyed coating of the hardened steel part includes from 0.1 to 40.0% by weight of zinc.

14. The assembly as recited in claim 13 wherein the alloyed coating of the hardened steel part includes from 0.1 to 20.0% by weight of zinc.

15. The assembly as recited in claim 12 wherein the alloyed coating of the hardened steel part includes from 0.1 to 20.0% by weight of silicon.

16. The assembly as recited in claim 15 wherein the alloyed coating of the hardened steel part includes from 0.1 to 15.0% by weight of silicon.

17. The assembly as recited in claim 12 wherein the alloyed coating of the hardened steel part includes from 0.1 to 20.0% by weight of magnesium.

18. The assembly as recited in claim 17 wherein the alloyed coating of the hardened steel part includes from 0.1 to 10.0% by weight of magnesium.

19. The assembly as recited in claim 12 wherein a second metallic substrate of the at least two metallic substrates is a steel substrate or an aluminum substrate.

20. The assembly as recited in claim 12 wherein the second steel substrate is a further hardened steel part coated with a further alloyed coating including zinc and silicon, and optionally magnesium, a balance being aluminum, the further alloyed coating being directly topped by a further native oxide layer including ZnO and optionally MgO.

21. The assembly as recited in claim 12 further comprising a third metallic substrate sheet being a steel substrate or an aluminum substrate.

22. An automotive vehicle comprising the assembly as recited in claim 12.

23. A method for manufacturing an automotive vehicle comprising performing the welding method as recited in claim 1.

* * * * *